(12) United States Patent
Weagle

(10) Patent No.: US 7,048,292 B2
(45) Date of Patent: May 23, 2006

(54) BICYCLE SUSPENSION SYSTEMS

(76) Inventor: David Weagle, P.O. Box 1184, Edgartown, MA (US) 02539

( * ) Notice: Subject to any disclaimer, the term of this patent is extended or adjusted under 35 U.S.C. 154(b) by 0 days.

(21) Appl. No.: 10/669,412

(22) Filed: Sep. 25, 2003

(65) Prior Publication Data

US 2005/0067810 A1 Mar. 31, 2005

(51) Int. Cl.
*B62K 25/28* (2006.01)
(52) U.S. Cl. ...................... 280/285; 280/284
(58) Field of Classification Search ............... 280/284, 280/285
See application file for complete search history.

(56) References Cited

U.S. PATENT DOCUMENTS

| | | | |
|---|---|---|---|
| 4,789,174 A | 12/1988 | Lawwill | |
| 5,121,937 A | 6/1992 | Lawwill | |
| 5,217,241 A | 6/1993 | Girvin | |
| 5,244,224 A | 9/1993 | Busby | |
| 5,306,036 A | 4/1994 | Busby | |
| 5,409,249 A | 4/1995 | Busby | |
| 5,441,292 A | 8/1995 | Busby | |
| 5,474,318 A | 12/1995 | Castellano | |
| 5,509,679 A | 4/1996 | Leitner | |
| 5,553,881 A | 9/1996 | Klassen et al. | |
| 5,628,524 A | 5/1997 | Klassen et al. | |
| 5,671,936 A | 9/1997 | Turner | |
| 5,678,837 A | 10/1997 | Leitner | |
| 5,791,674 A | 8/1998 | D'Aluisio et al. | |
| 5,899,480 A | 5/1999 | Leitner | |
| 6,102,421 A * | 8/2000 | Lawwill et al. | 280/285 |
| 6,199,886 B1 | 3/2001 | Guenther | |
| 6,203,042 B1 | 3/2001 | Wilcox | |
| 6,206,397 B1 | 3/2001 | Klassen et al. | |
| 6,378,885 B1 | 4/2002 | Ellsworth et al. | |
| 6,450,521 B1 * | 9/2002 | Turner | 280/284 |
| 6,471,230 B1 * | 10/2002 | Ellsworth et al. | 280/284 |
| 6,595,538 B1 * | 7/2003 | Ellsworth et al. | 280/284 |
| 6,854,753 B1 * | 2/2005 | Turner | 280/284 |
| 2005/0057018 A1 | 3/2005 | Saiki | |

* cited by examiner

*Primary Examiner*—Lesley D. Morris
*Assistant Examiner*—Matthew Luby
(74) *Attorney, Agent, or Firm*—Perkins Coie LLP

(57) ABSTRACT

A bicycle rear wheel suspension system in which plural interconnections are provided of rear wheel-supporting components, at which interconnections there occurs pivotal traverses contributing to urging the axle of the rear wheel along a path providing positions of movement therealong to achieve a desired extent of pressure feedback to the pedals, an easing of suspension reaction to bumps, and multiple chainstay lengths, all parameters to better suit the bicycle to its end uses and the terrain on which it is used.

8 Claims, 3 Drawing Sheets

BICYCLE SUSPENSION SYSTEMS

The present invention relates generally to improvements for bicycles, the improvements more particularly residing in a link suspension system that can more effectively be tuned to balance forces in the rear suspension of the bicycle, all as will be better understood as the description proceeds.

EXAMPLE OF THE PRIOR ART

Take into consideration the system described by U.S. Pat. No. 6,206,397 B1. This link suspension system claims linkage arrangement and a defined range of rear wheel axle paths for a suspension bicycle. The axle path claimed and shown in the patent art can be manipulated into an S shape, or a converging C shape. The theory behind this is that during the lower part of the suspension travel, the wheel axle will travel at an increasing rate, away from the bottom bracket center. By achieving this, the designers hope to increase the resistance to rear suspension compression during the beginning of the travel. This resistance to suspension compression is called anti-squat in popular engineering text. As the '397 patent is examined, it becomes obvious that the inventors overlooked several key factors that must be evaluated in order to obtain a clear understanding of anti-squat and how it pertains to a suspension system. The system as described in the '397 patent feature pro-squat in the beginning of the suspension travel, and a rising rate of anti-squat as the suspension cycles through the end of its travel. In practice bicycles designed using the system described in the '397 patent feature inefficient acceleration in the beginning of the suspension travel, where efficient acceleration is needed most.

As background to understanding the present invention it is to be noted that a link bicycle suspension system is a defined specific range of kinematical linkages which can be used to produce a tactical rear axle path. Each combination of linkages can be tuned to balance forces in the rear suspension of the bicycle in ways that no previous system has been able to. Variations of the linkage layout can shift the balance of forces to give distinct advantages for suspension systems used for differing applications. The suspension system allows a designer to manipulate the rear axle path in relation to the bicycle frame. Manipulating axle paths has a huge impact on the performance of the rear suspension, since axle path governs several key aspects of suspension performance.

It is an object of the present invention to achieve a desired variable amount of anti-squat as the rear suspension cycles through its travel. Manipulating rear axle path in a tactical manner using a linkage system allows the designer to obtain a desired range of anti-squat curves. A preferred anti-squat curve is one that features a higher amount of anti-squat in the beginning of the suspension travel, and a lesser amount as the suspension cycles compressively through its travel. This anti-squat amount lessens with regard to the amount of spring force provided by a spring damper unit. In addition to this lessening anti-squat amount as the suspension compresses, the linkage arrangement is also designed to impart a minimal amount of feedback to the pedals as the suspension cycles. The preferred linkage arrangement also can be optimized so that a spring damper unit can be driven at a strategic leverage rate, furthermore reducing inefficient rear wheel movement. Also the linkage arrangement can be strategically placed so that the effect of braking force on rear wheel movement is minimized.

The description of the invention which follows, together with the accompanying drawings should not be construed as limiting the invention to the example shown and described, because those skilled in the art to which this invention appertains will be able to devise other forms thereof within the ambit of the appended claims.

Figure 1:
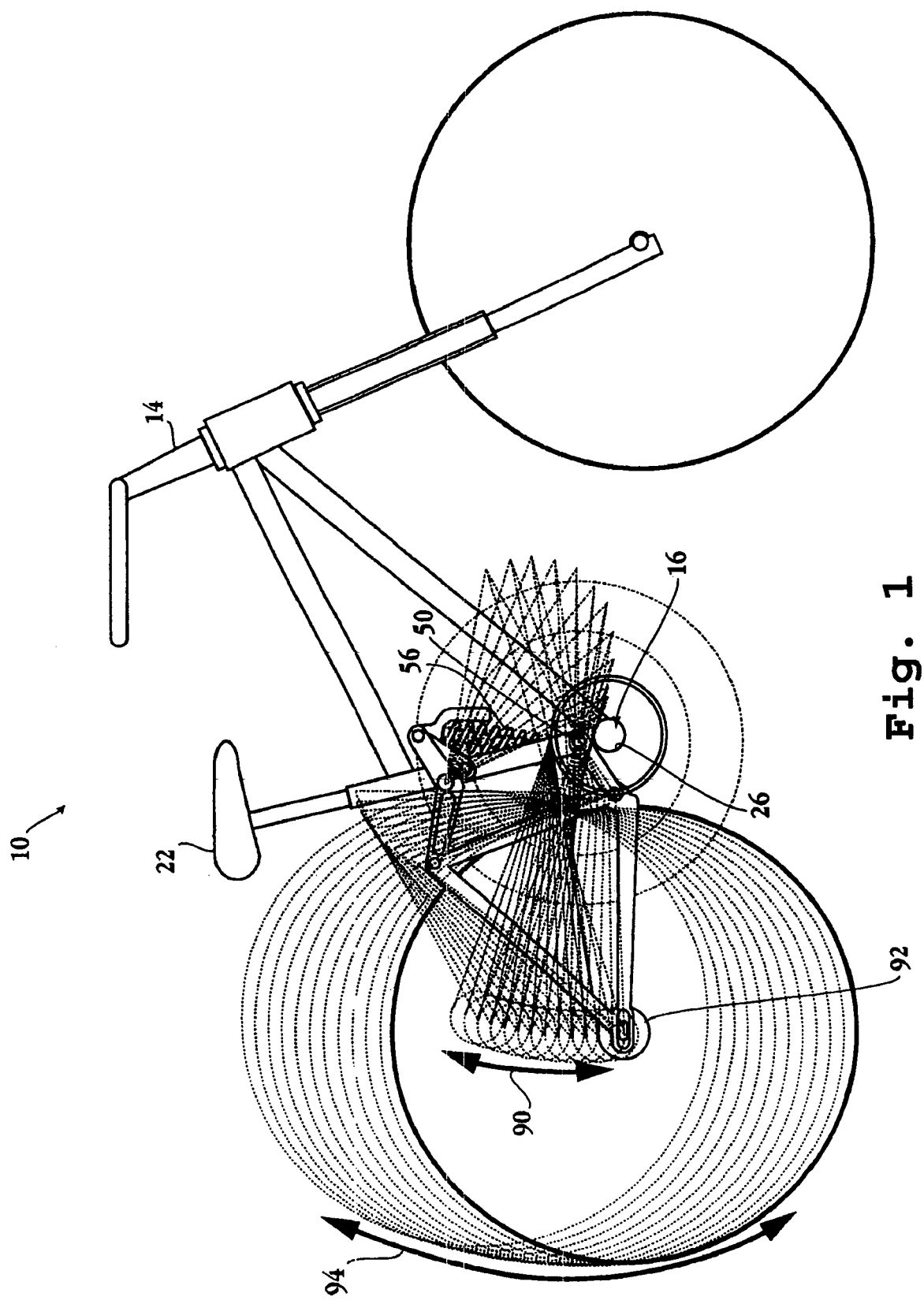
FIG. 1 is a diagrammatic view of a mode of adjusting bicycle rear wheel suspension according to the present invention.
Figure 2:
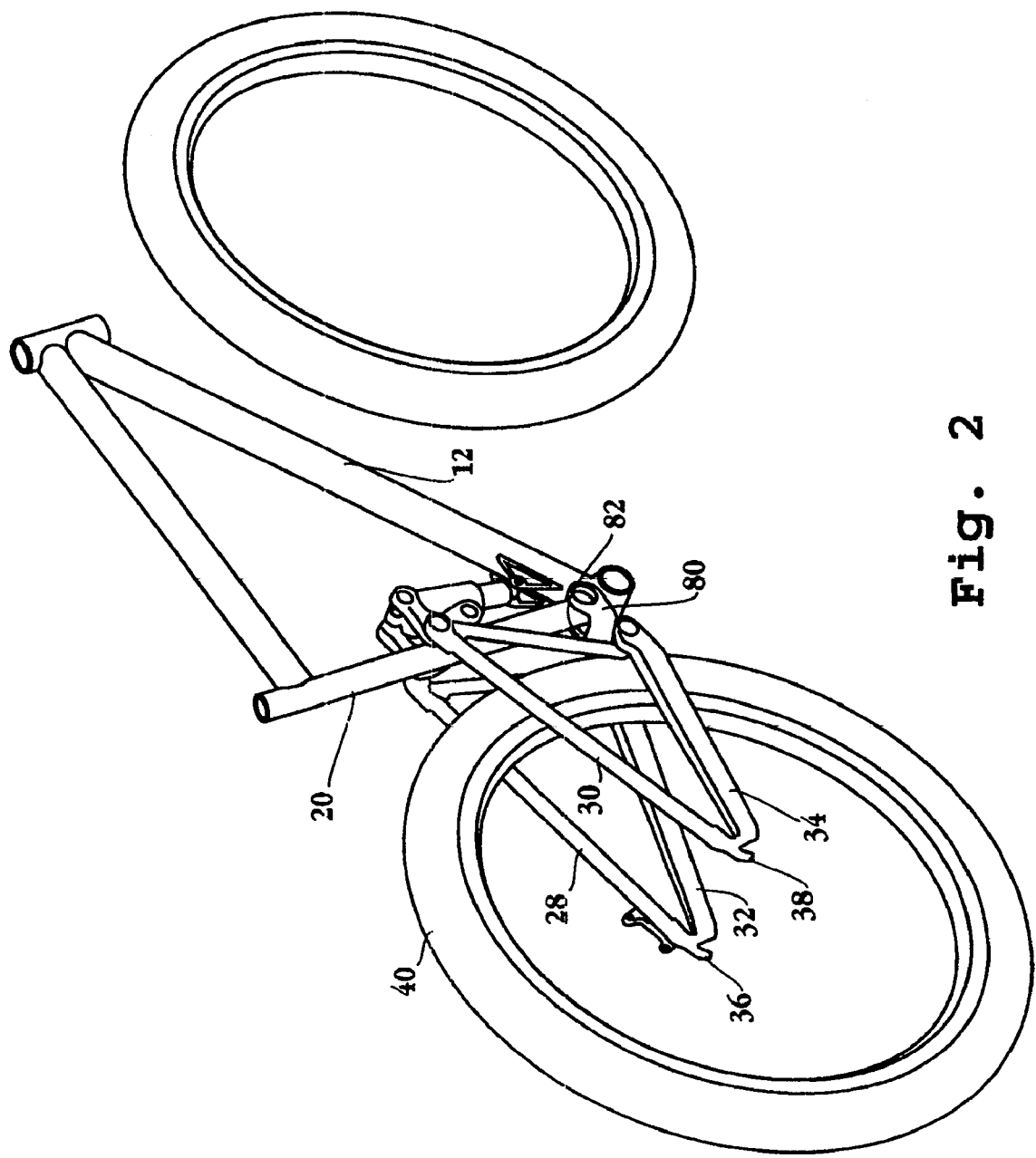
FIG. 2 is a partial perspective view of a bicycle component providing the rear wheel suspension.
Figure 3:
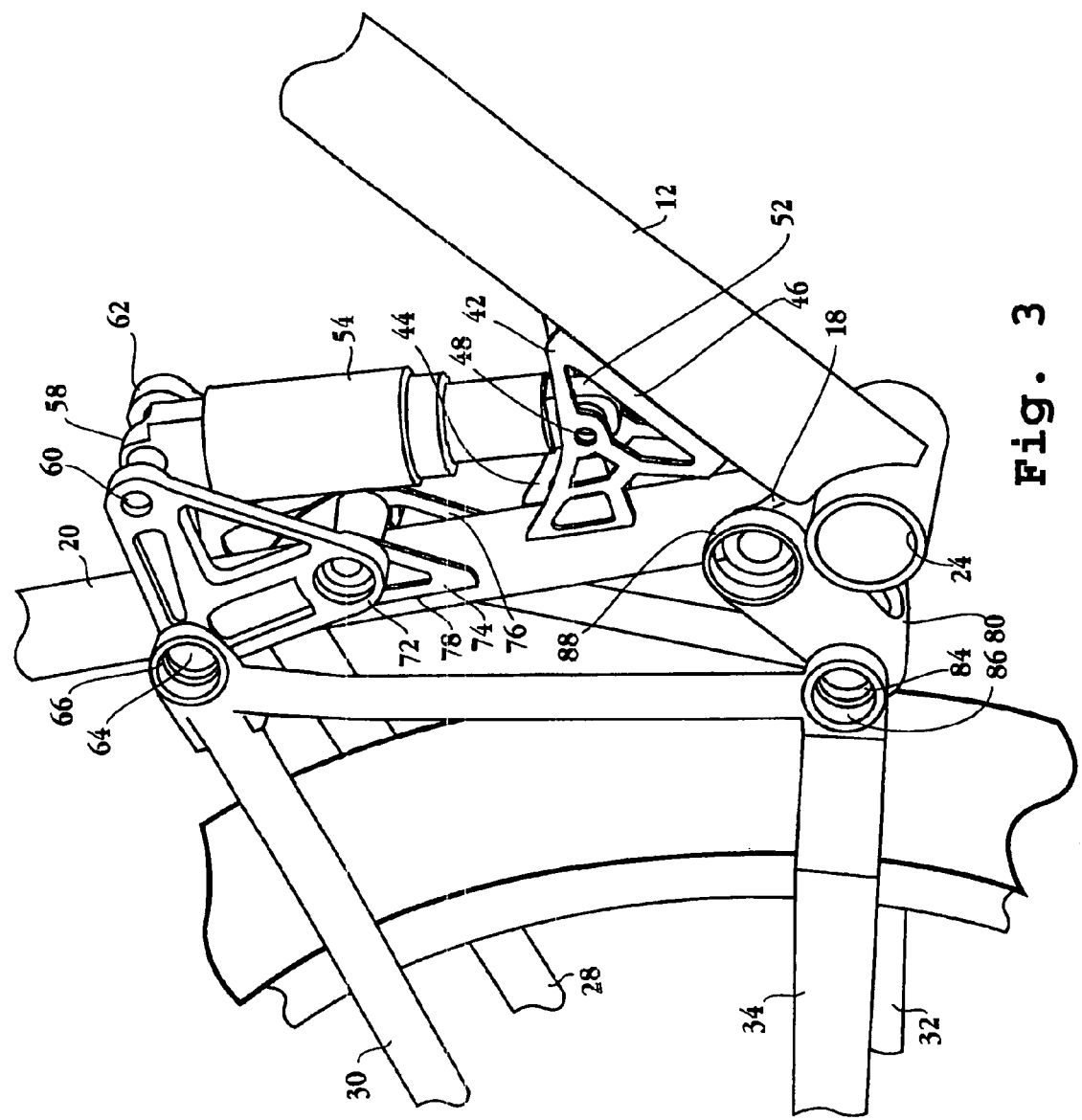
FIG. 3 is a view similar to FIG. 2 on an enlarged scale.

A link suspension system according to the present invention is embodied in a bicycle 10 having a body frame member 12 which extends from a handlebar 14 rearwardly downward at an angular orientation to a pedal mechanism 16 and is integral at juncture 18 to a vertically oriented frame member 20 which supports a bicycle seat 22. At the junction 18, a cylindrical configuration 24 is provided for journaling in rotation the rotor 26 of the pedal mechanism 16.

Mounted to extend rearwardly of the frame members 12, 20 are an upper angularly oriented pair of supports 28 and 30 and lower horizontal pair of supports 32 and 34 which at respective ends 36 and 38 are attached to a rear wheel 40 for rotatably mounting of the rear wheel 40 to the bicycle.

Just above the juncture 18 are spaced apart brackets 42 and 44 welded as at 46 to frame member 12 having aligned openings 48 for receiving therethrough bolt means 50 connecting thereto the bottom end 52 of a housing 54 of an internally mounted damper spring 56, the upper housing end 58 being connected to a pair of triangular brackets 60 and 62, in turn connected, as at 64, to cooperating openings 66 provided in rear wheel supports 32 and 34, the remaining bracket opening 72 being bolted to support bracket 74 and 76 welded, as at 78, to the seat support frame 20.

Completing the link suspension system are brackets 80 and 82 connected at opposite ends 84 to cooperating openings 86 provided in the rear wheel supports 32 and 34 and at ends 88 to the junction 18.

Referring to the diagrammatic illustration of FIG. 1, it will be understood that the interconnections at 48, 72, 66 enable the interconnected components to partake of a multitude of pivotal traverses, of which a significant pivotal traverse 90 implements axle path changes in a rear sprocket 92 of the rear wheel 40 contributing to a range 94 of rear wheel positions, all to the end of achieving a selected (1) extent of pressure feedback to the pedals, (2) an easing of suspension reaction to bumps, and (3) as known in the parlance of the art, multiple chainstay lengths. Thus, one well versed in the art is able by selection to tune the described combination of linkages to balance forces in the rear suspension of the bicycle as desired and as dictated by the end use of the bicycle and the terrain on which it is used.

While the apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A compressible linkage suspension system for a bicycle rear wheel comprising a plurality of links and pivots isolating the rear wheel from a frame member which comprises a seat and a crank pedal unit, wherein said links partake in pivotal traverses to achieve an anti-squat response, where said anti-squat response is higher in the beginning of the suspension travel, and lesser thereafter.

2. The compressible linkage suspension system according to claim 1, wherein the center of said rear wheel is located below the upper pivot of a damper unit of said suspension system.

3. The compressible linkage suspension system according to claim 1, wherein said frame member is located behind a damper unit of said suspension system.

4. The compressible linkage suspension system according to claim 1, wherein said the tube of said seat is located behind a damper unit of said suspension system.

5. The compressible linkage suspension system according to claim 1, wherein the center of said crank pedal unit is located below the upper pivot of a damper unit of said suspension system.

6. The compressible linkage suspension system according to claim 1, wherein said pivotal traverses facilitate rear wheel suspension while maintaining a low squat response.

7. The compressible linkage suspension system according to claim 1, wherein said links are located on the side of said frame member.

8. The compressible linkage suspension system according to claim 1, wherein said upper link pivots are located above said crank pedal unit.

* * * * *